United States Patent
Garbagnati

(10) Patent No.: US 6,938,732 B2
(45) Date of Patent: Sep. 6, 2005

(54) CHAIN WITH PINS EQUIPPED WITH LUBRICATING CARTRIDGES AND CARTRIDGE FOR SAID CHAIN

(75) Inventor: Carlo Garbagnati, Castello Brianza (IT)

(73) Assignee: Regina S.I.C.C. S.p.A., Milan (IT)

( * ) Notice: Subject to any disclaimer, the term of this patent is extended or adjusted under 35 U.S.C. 154(b) by 202 days.

(21) Appl. No.: 10/263,737

(22) Filed: Oct. 4, 2002

(65) Prior Publication Data

US 2003/0070880 A1 Apr. 17, 2003

(30) Foreign Application Priority Data

Oct. 12, 2001 (IT) .................................... MI2001A2111

(51) Int. Cl.⁷ .............................................. B65G 45/08
(52) U.S. Cl. ...................... 184/15.1; 198/500; 305/59; 305/117; 59/4; 59/5; 474/231
(58) Field of Search ................................ 184/5.1, 15.1; 198/500; 305/117, 202, 59; 59/3, 4, 5, 8, 78, 78.1; 474/230, 231

(56) References Cited

U.S. PATENT DOCUMENTS

| | | | | |
|---|---|---|---|---|
| 3,762,778 A | * | 10/1973 | Boggs et al. ............... | 305/118 |
| 3,847,248 A | * | 11/1974 | Avery ......................... | 184/109 |
| 3,862,457 A | * | 1/1975 | Swindell et al. ............ | 184/6 |
| 4,042,065 A | * | 8/1977 | Crum ......................... | 184/109 |
| 4,106,816 A | * | 8/1978 | August ..................... | 301/108.1 |
| 4,190,133 A | * | 2/1980 | Ploeger ..................... | 184/5.1 |
| 4,265,084 A | * | 5/1981 | Livesay ...................... | 59/7 |
| 4,410,311 A | * | 10/1983 | Hennessy ................... | 464/17 |
| 5,077,965 A | * | 1/1992 | Jedamzik ................... | 59/78 |
| 5,172,965 A | * | 12/1992 | Taft ........................... | 305/187 |
| RE34,391 E | * | 9/1993 | Blake ......................... | 184/5.1 |
| 5,267,904 A | * | 12/1993 | Geisthoff ................... | 464/136 |
| 5,303,800 A | * | 4/1994 | Persson ..................... | 184/5.1 |
| 5,374,115 A | * | 12/1994 | Ketting ...................... | 305/103 |
| 5,425,679 A | * | 6/1995 | Utz ............................ | 474/91 |
| 5,584,359 A | * | 12/1996 | Reinersman ................ | 184/5.1 |
| 6,270,173 B1 | * | 8/2001 | Hashimoto et al. ......... | 305/202 |
| 6,364,799 B1 | * | 4/2002 | Campagnolo ............... | 474/206 |
| 6,615,974 B2 | * | 9/2003 | Scholz ....................... | 198/712 |
| 2001/0001223 A1 | * | 5/2001 | Miyaura ..................... | 305/202 |

FOREIGN PATENT DOCUMENTS

| | | | | | |
|---|---|---|---|---|---|
| JP | 10101210 A | * | 4/1998 | ........... | B65G/17/38 |
| JP | 11278644 A | * | 10/1999 | ........... | B65G/45/08 |

* cited by examiner

*Primary Examiner*—Chong H. Kim
(74) *Attorney, Agent, or Firm*—Jacobson Holman PLLC

(57) ABSTRACT

A chain with links made of plates connected with hollow pins containing a reserve of lubricant connected with the chain parts to be lubricated. The lubricant reserve is contained in replaceable cartridges inserted removably in the pins through an appropriate end passage. The cartridge can be made with an enlarged section to constitute a plug of the pin in which it is received.

14 Claims, 2 Drawing Sheets

Tav. II

CHAIN WITH PINS EQUIPPED WITH LUBRICATING CARTRIDGES AND CARTRIDGE FOR SAID CHAIN

BACKGROUND OF THE INVENTION

The present invention relates to a transmission and/or conveyance chain with a reserve lubricating fluid cartridge. The present invention also relates to a lubricating cartridge for said chain.

Transmission and/or conveyance chains equipped with hollow pins filled with lubricating fluid and with passages for the fluid from the inside of the pin to the parts to be lubricated are known. These chains suffer from the disadvantage of requiring a periodic long and dirty lubricant replenishment operation. Indeed, for each pin it is necessary to remove or drill the plug closing the pin, input lubricant to the pin by means of a pressure device and, lastly, reseal the pin.

The general purpose of the present invention is to remedy the above mentioned shortcomings by making available a chain with a lubricating fluid reserve in which the lubricant replenishment operations are fast, simple and clean. Another purpose is to make available a lubricating cartridge for said chain.

SUMMARY OF THE INVENTION

In view of this purpose it was sought to provide in accordance with the present invention a chain with links made of plates connected by hollow pins containing a lubricant reserve and connected with the chain parts to be lubricated and characterized in that the lubricant reserve is contained in replaceable cartridges inserted in said pins through an end passage.

Again in accordance with the present invention it was sought to realize a cartridge containing a lubricant reserve and designed to be inserted in a removable manner in hollow pins of a chain equipped with links made up of plates connected by said hollow pins to constitute a lubricant reserve connected with parts of the chain to be lubricated.

BRIEF DESCRIPTION OF THE DRAWINGS

To clarify the explanation of the innovative principles of the present invention and its advantages compared with the prior art there are described below with the aid of the annexed drawings possible embodiments thereof by way of non-limiting examples applying said principles. In the drawings.

DETAILED DESCRIPTION OF THE INVENTION

Figure 1:
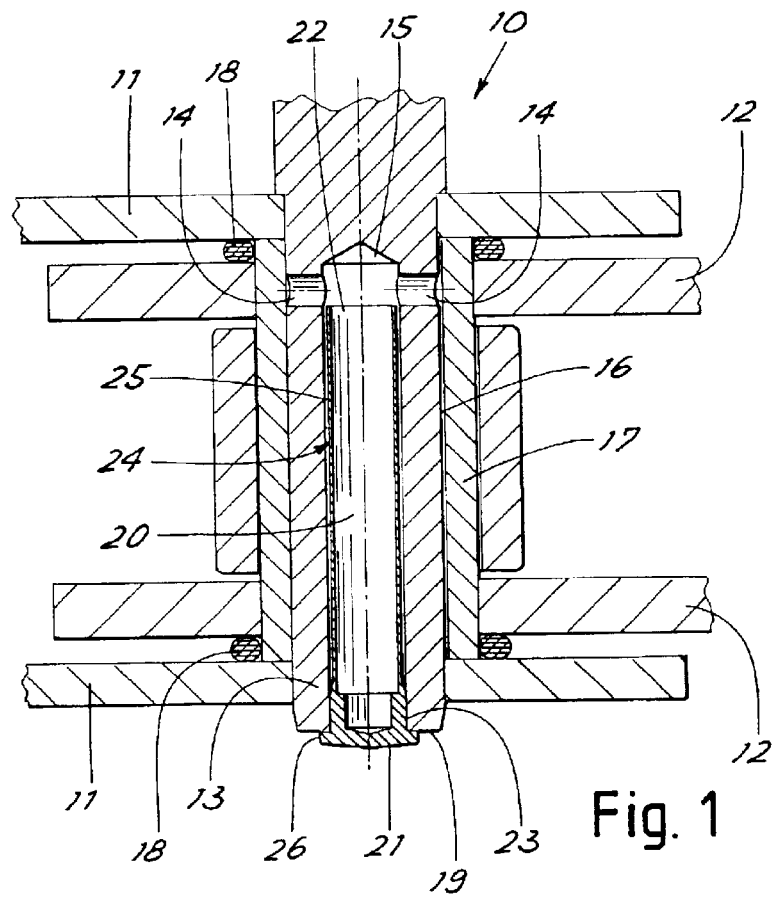
FIG. 1 shows a cross section view of a section of chain in accordance with the present invention in a pin part.

With reference to the FIGS, FIG. 1 shows a chain section designated as a whole by reference number 10 in a pin part thereof. The chain 10 comprises plates 11, 12 connected with hollow pins 13 equipped with passages 14 advantageously radial for putting in communication the cavities 15 in the pin with parts of the chain to be lubricated. In particular, the passages are in communication with a space 16 identified in the interface between the outer wall of the pin and a bush 17 fitted on the pin. The interface space 16 is closed and sealed towards the exterior for example by sealing gaskets 18 arranged between plates and bush.

The pin 13 has at least one open end 19 through which is inserted therein a replaceable cartridge 20 containing a reserve of suitable lubricating fluid.

The cartridge has a closed end 21 designed to be arranged near the open end of the pin and an opposite open end 22 designed to be received inside the pin.

Advantageously the open end of the cartridge is arranged in the pin near the radial passages in the pin for distribution of the lubricant to the chain parts to be lubricated.

A section 23 of the cartridge near the closed end has a slightly greater diameter than the corresponding inside diameter of the pin so that the cartridge will fit with interference in the pin and constitute a sealing plug thereof also to prevent the cartridge from accidentally coming out of the pin.

Advantageously at least a section 24 of the cartridge near the open end 22 has a diameter smaller than the corresponding inside diameter of the pin to leave an air space 25 between the outer wall of the cartridge and the facing internal wall of the pin. This avoids a "piston" effect upon insertion of the cartridge in the pin by allowing air to come out. In addition, if for construction reasons the radial hole in the pin were to be positioned rearward from the open end of the cartridge the air space 25 would allow the lubricant to flow towards the radial hole.

Advantageously the closed end of the cartridge protrudes from the pin with a head having enlarged diameter 26 forming a stop edge against insertion of the cartridge in the pin to avoid excessive sinking of the cartridge into the pin.

The edge 26 can also be used to allow grasping and removal of the cartridge from the pin even by merely inserting an appropriate tool under the edge to remove the cartridge by levering against the end of the pin.

Figure 2:
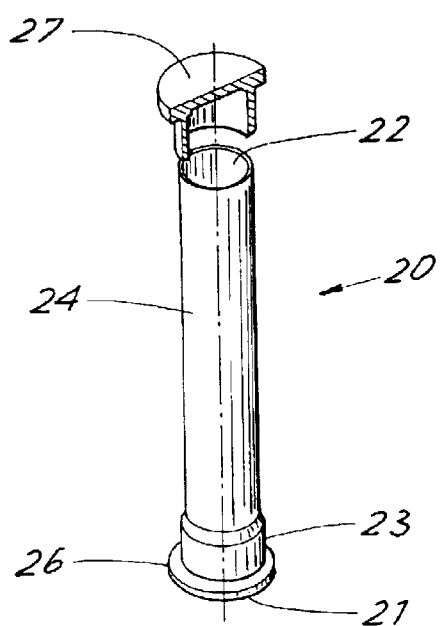
FIG. 2 shows an exploded view of a lubricant cartridge in accordance with the present invention.

FIG. 2 shows a cartridge 20 before insertion thereof in the pin. As may be seen, the cartridge can be advantageously equipped with a closing plug 27 which is removed from the end 22 before insertion of the cartridge in a pin. The plug can be made of rubber or other appropriately elastic material to be engaged with pressure on the open end of the cartridge.

Once the plug 27 is removed, the cartridge can be easily and rapidly inserted in a chain pin. The natural viscosity of the lubricating fluid prevents the mass of lubricant from coming out when the unplugged cartridge is tilted horizontally to be inserted in a pin.

In the embodiment shown in FIG. 1 the pin has one end closed and the passages 14 are made toward the bottom of the cavity in which the cartridge is housed downstream of the point of outflow of the lubricant from the cartridge. The cartridge is thus nearly as long as the entire pin so as to maximize the lubricant content.

Figure 3:
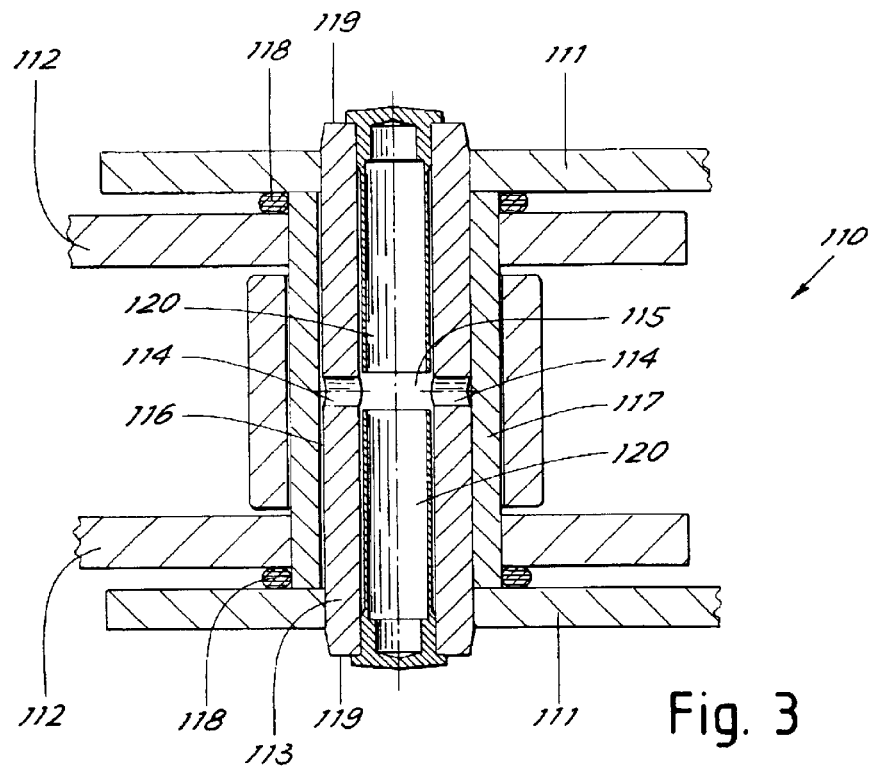
FIG. 3 shows a view similar to that of FIG. 1 of a second embodiment of a chain in accordance with the present invention.

FIG. 3 shows a second embodiment in which the pin has both ends open and receives two cartridges from the opposite ends. For the sake of convenience, in FIG. 3 parts similar to those of FIG. 1 are designated by the same numbers increased by 100. Thus there is a chain 110 comprising plates 111, 112 connected with hollow pins 113 equipped with passages 114 advantageously radial to provide communication between the cavity 115 in the pin and the space 116 between the pin and the bush 117 sealed with sealing gaskets 118.

As may be seen in FIG. 3, the pin 113 has both ends 119 open and through each of them is inserted a replaceable cartridge 120 similar to the cartridge 20 described above and containing the reserve of suitable lubricating fluid. The open ends of the two cartridges are thus facing each other. The length of the two cartridges is clearly such as to allow full insertion thereof into the pin. In particular, it is advantageous that each cartridge 120 enter into the pin 113 for a length less than half the pin length to have the respective ends of the two open and facing cartridges spaced from each other. In the central space between the open ends of the cartridges there are the passages 114.

Figure 4:
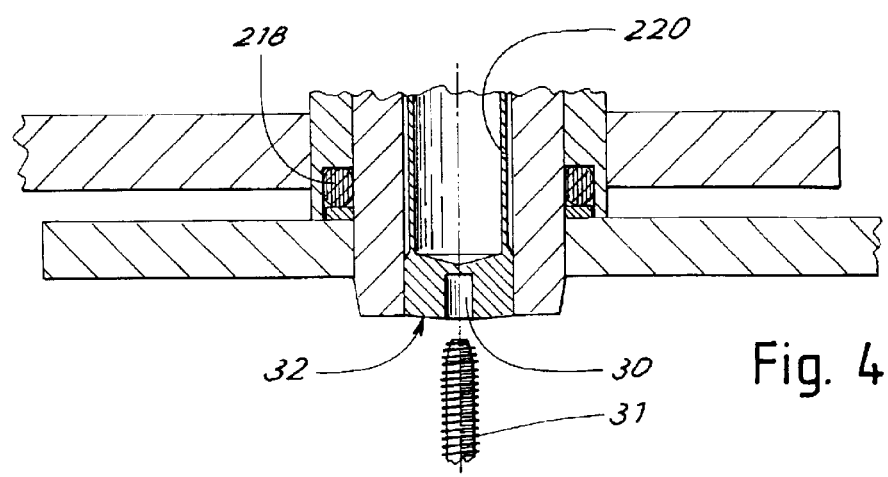
FIG. 4 shows a partial diagrammatic view of an embodiment variant.

FIG. 4 shows an alternative shape of the cartridge bottom (designated as a whole by reference number 210) suitable for the embodiments of both FIG. 1 and FIG. 3. As may be seen in FIG. 4, the cartridge 220 is made with dimensions such as to be inserted virtually flush with the end of the pin receiving it. The cartridge bottom 32 which faces the open end of the pin has a cavity 30 for engagement of the cartridge with and extraction thereof from the pin. The cavity can be for example a mere blind hole in which can be screwed the threaded point 31 of an appropriate tool, for example even a small screw, to be pulled for extracting the cartridge from its seat.

FIG. 4 also shows a variant embodiment of the hydraulic seal of the lubricated air space where the gaskets 218 are housed between bush and pin instead of between bush and plates. This variant can of course be applied to all the embodiments shown.

It is now clear that the predetermined purposes have been achieved by making available chains with a reserve of lubricant which can be easily replenished in a quick and clean manner by merely drawing out of the pin a depleted cartridge and inserting in the pin a new cartridge already filled with suitable lubricant. It is also possible to make different cartridges for different lubricant types and which can be inserted only in the chains (with appropriately made pins) which need that particular type of lubricant so as to prevent erroneous lubrication.

Replacement is fast and easy whether for planned maintenance operations or operations involving opening of the chain with resulting loss of lubricant which upon closing of the chain again must be replenished.

Thanks to the use of prefilled cartridges the quantity of lubricant is known and constant for all pins.

Naturally the above description of embodiments applying the innovative principles of the present invention is given by way of non-limiting example of said principles within the scope of the exclusive right claimed here. For example known changes to the shape of the chain can be readily imagined by those skilled in the art depending on specific requirements.

What is claimed is:

1. Chain comprising
   links made of plates connected by hollow pins having inner cavities for containing lubricant fluid, said inner cavities being connected with chain parts to be lubricated, said cavities having at least one passage extending transversely therefrom for lubricating the chain parts, and
   replaceable cartridges inserted inside said cavities of said pins through an end opening and an open end of said cartridges extending to said at least one passage, said replaceable cartridges containing pre-installed lubricant fluid and a length of said replaceable cartridges extending from the end opening of said pins to said at least one passage for release of the lubricant fluid to the at least one passage.

2. Chain in accordance with claim 1, wherein the cartridge includes a closed end designed to be arranged near an open end of the pin and an opposite open end designed to be received inside the pin.

3. Chain in accordance with claim 2, wherein the closed end has a larger diameter than the corresponding inside diameter of the pin to be interference fitted therein and constitutes a sealing plug thereof.

4. Chain in accordance with claim 3, wherein at least one section of the cartridge near the open end has a diameter smaller than the corresponding inside diameter of the pin to leave an airspace between an outer wall of the cartridge and a facing inner wall of the pin.

5. Chain in accordance with claim 2, wherein the open end of the cartridge is arranged in the pin near a radial passage in said pin for distribution of lubricant to said chain parts to be lubricated.

6. Chain in accordance with claim 2, wherein the closed end of the cartridge protrudes from the pin with a head having an enlarged diameter to constitute a stop against insertion of the cartridge in the pin.

7. Chain in accordance with claim 6, wherein the head with enlarged diameter constitutes a part for grasping of the cartridge to extract the cartridge from the pin.

8. Chain in accordance with claim 2, wherein the closed end faces the open end of the pin with a bottom having a cavity for engagement of the cartridge and extraction of the cartridge from the pin.

9. Chain in accordance with claim 1, wherein each pin receives two cartridges inserted from opposite open ends of the pin to have respective open ends facing one another.

10. Chain in accordance with claim 9, wherein each cartridge enters in the pin by a length less than half a length of the pin to have the respective ends open and facing each other with there being in the pin in the space between the ends passages for distribution of the lubricant to said parts of the chain to be lubricated.

11. Chain in accordance with claim 1, wherein each pin receives a cartridge from one end and has an opposite end closed.

12. Chain in accordance with claim 1, wherein each pin has a respective bush with there being identified between pin and respective bush an interface space closed and sealed toward an exterior by sealing gaskets with said space being connected with an internal space of the pin to constitute said chain parts to be lubricated.

13. Chain in accordance with claim 12, wherein the sealing gaskets are arranged between plates and bushes.

14. Chain in accordance with claim 12, wherein the sealing gaskets are arranged between bushes and pins.

* * * * *